United States Patent
Fujikawa et al.

(10) Patent No.: US 7,679,548 B2
(45) Date of Patent: Mar. 16, 2010

(54) RADAR APPARATUS

(75) Inventors: Takumi Fujikawa, Nishinomiya (JP); Motoji Kondo, Nishinomiya (JP); Sae Takemoto, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 946 days.

(21) Appl. No.: 10/579,197

(22) PCT Filed: Nov. 15, 2004

(86) PCT No.: PCT/JP2004/017320

§ 371 (c)(1),
(2), (4) Date: May 12, 2006

(87) PCT Pub. No.: WO2005/047927

PCT Pub. Date: May 26, 2005

(65) Prior Publication Data

US 2007/0126624 A1 Jun. 7, 2007

(30) Foreign Application Priority Data

Nov. 14, 2003 (JP) .............................. 2003-385396

(51) Int. Cl.
*G01S 13/00* (2006.01)
*G01S 7/04* (2006.01)
(52) U.S. Cl. ..................................... 342/185
(58) Field of Classification Search .................. 342/185, 342/59, 176, 179, 360
See application file for complete search history.

(56) References Cited

U.S. PATENT DOCUMENTS

| 5,157,406 | A | 10/1992 | Fujikawa et al. |
| 6,441,775 | B1 * | 8/2002 | Fujikawa et al. ............. 342/185 |
| 2007/0018888 | A1 * | 1/2007 | Fujikawa et al. ............. 342/185 |
| 2007/0126624 | A1 * | 6/2007 | Fujikawa et al. ............. 342/185 |

FOREIGN PATENT DOCUMENTS

| JP | 61-231474 A | 10/1986 |
| JP | 5-126936 A | 5/1993 |
| JP | 8-271611 A | 10/1996 |
| JP | 9-21865 A | 1/1997 |
| JP | 2648983 B2 | 5/1997 |
| JP | 10-38997 A | 2/1998 |
| JP | 2003-28950 A | 1/2003 |

OTHER PUBLICATIONS

Machine translation of JP10038997.*

* cited by examiner

*Primary Examiner*—Dan Pihulic
(74) *Attorney, Agent, or Firm*—Birch, Stewart, Kolasch & Birch, LLP

(57) ABSTRACT

A radar apparatus where the rate of writing detected image data into an image memory does not decrease, irrespective of an enlarged amount of the detected image data. When an azimuth direction enlargement section of a W data generator receives detected image data of a sweep, it outputs the data to an image memory, and delays the data, depending on a cycle of an azimuth direction shift timing signal. When detected image data of a next sweep is drawn into a pixel adjacent in a sweep moving direction to a pixel into which previous detected image data has been drawn and is located at the same distance in a sweep distance direction, the delayed data is compared with new data, and the greater data is drawn into the new pixel. When the delayed data is greater, this detected image data is enlarged in the azimuth direction.

10 Claims, 7 Drawing Sheets

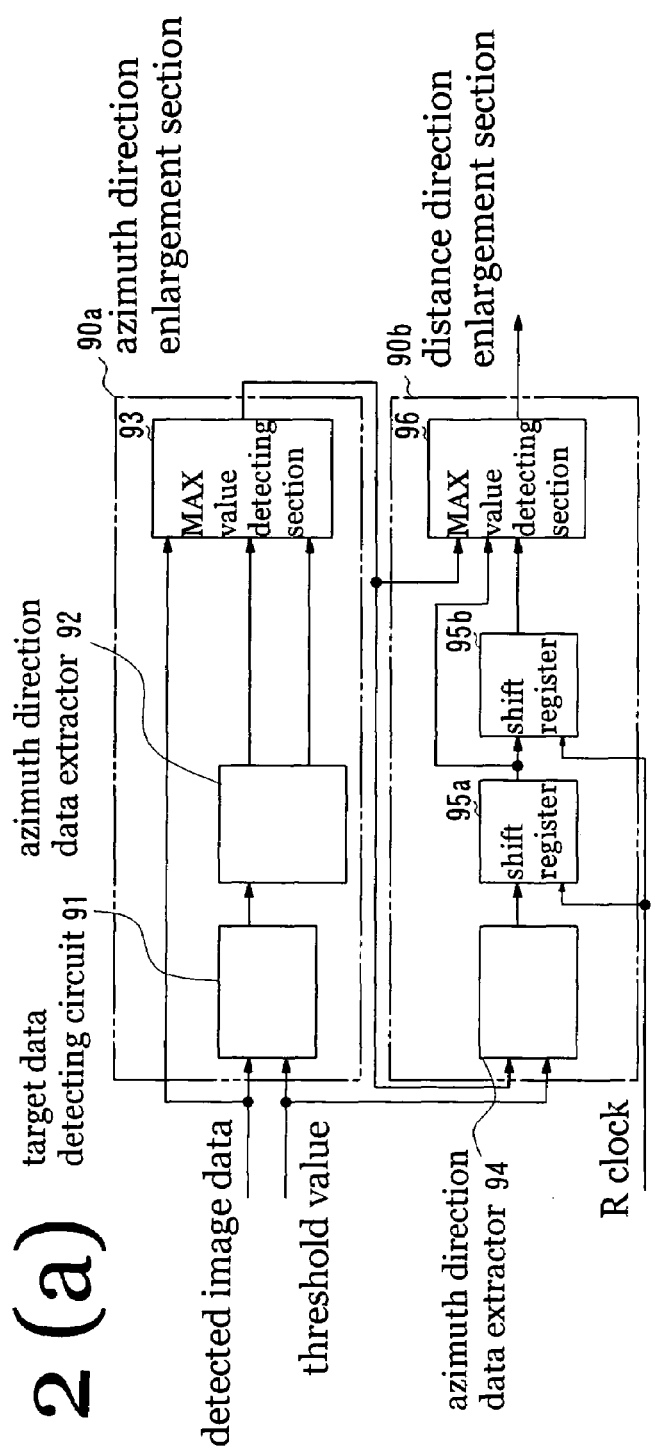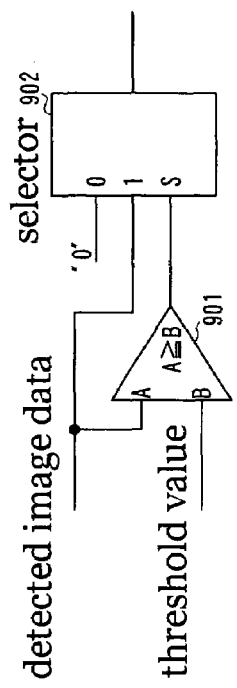
FIG. 2 (a)
FIG. 2 (b)

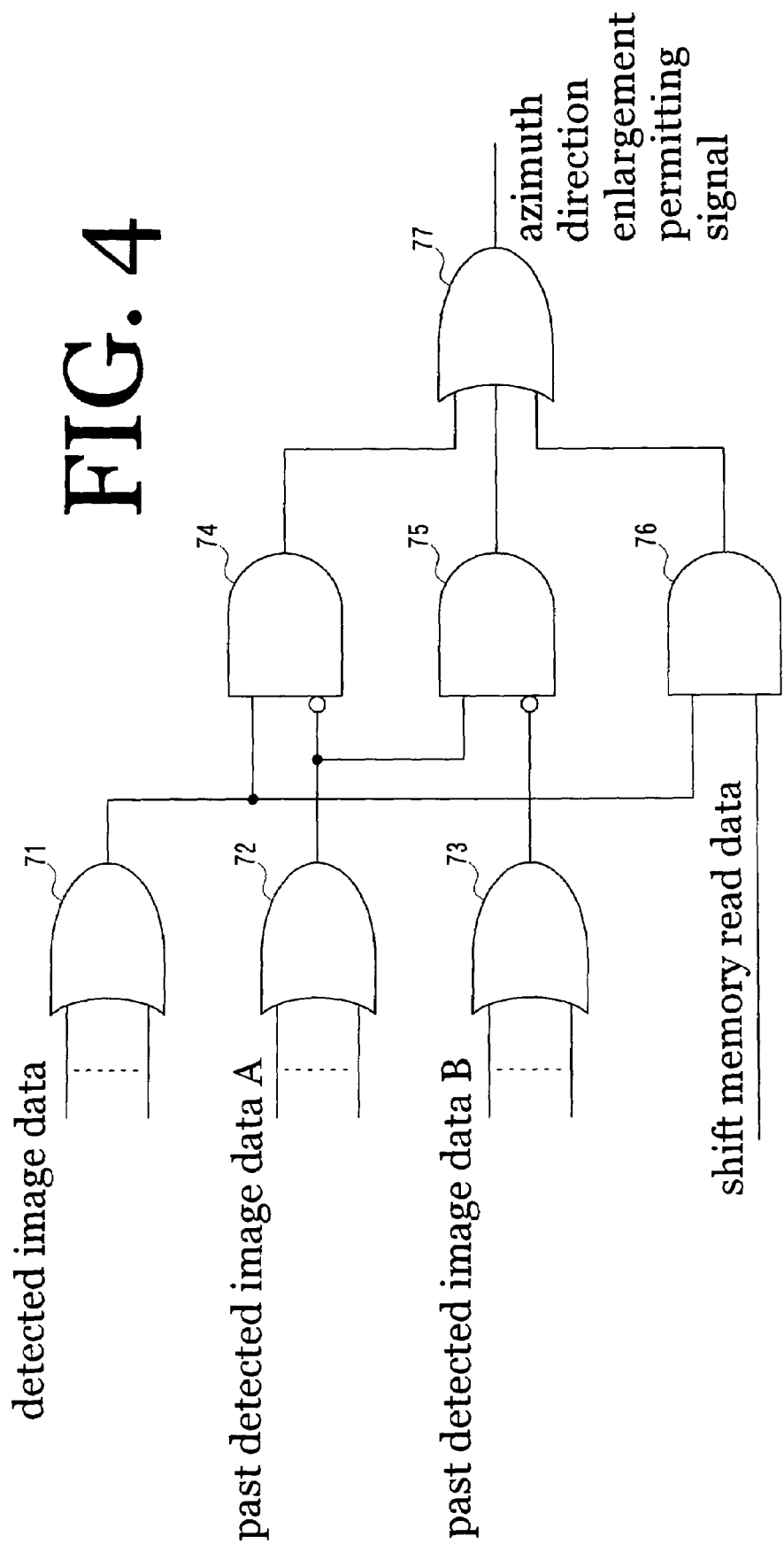

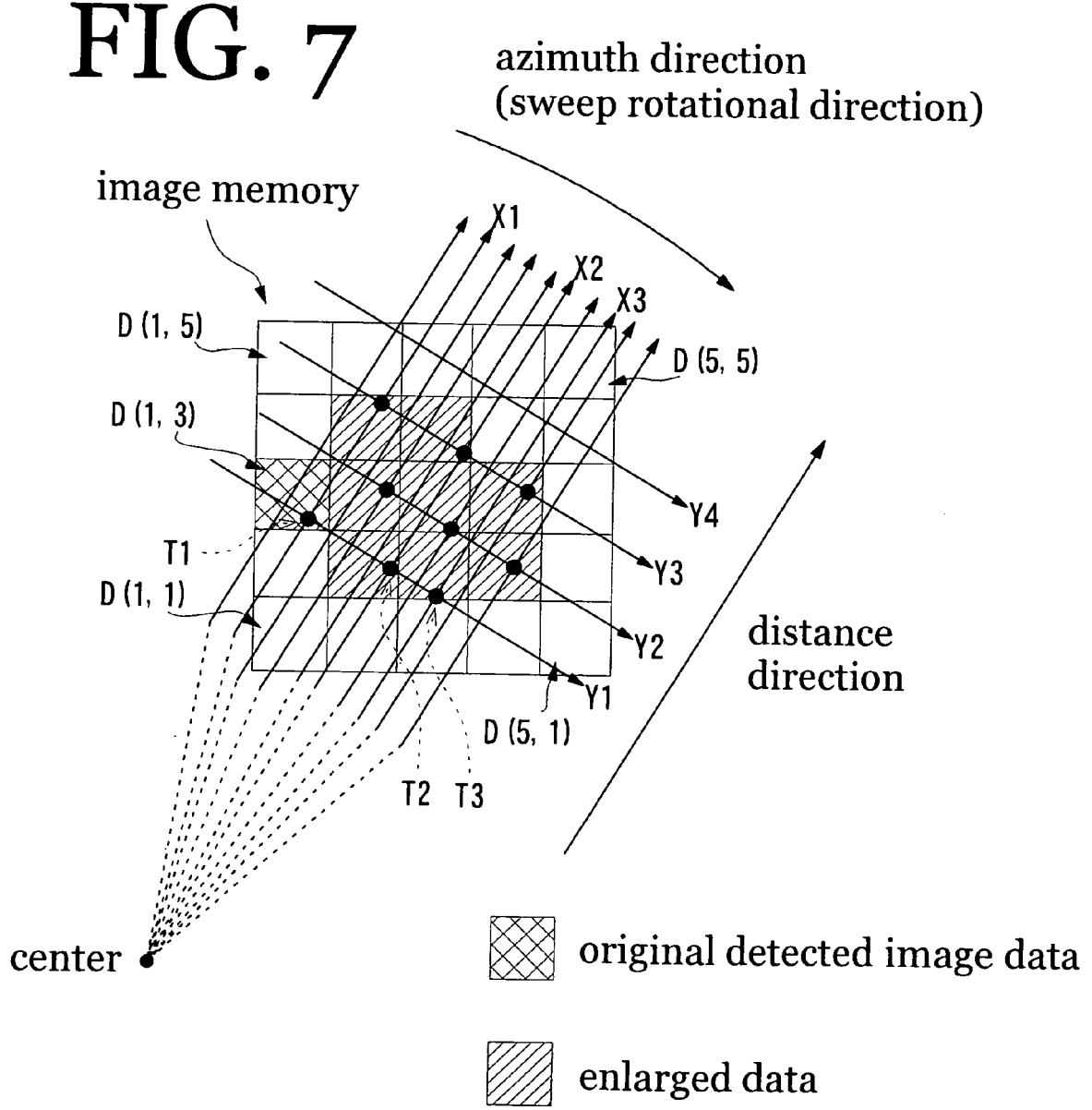

RADAR APPARATUS

TECHNICAL FIELD

The present invention relates to an apparatus for converting a detected signal which is received by a radar apparatus, a sonar apparatus, or the like and is represented by a polar coordinate system, into a rectangular coordinate system, storing resultant data into an image memory, and displaying the data on a raster scan type display. Particularly, the present invention relates to an enlarged display of detected data obtained from a detected signal.

BACKGROUND ART

In raster scan type radar apparatuses, the size of a video of a radar is basically determined based on a horizontal beam width and a transmitted pulse width. The wider the horizontal beam width, the larger the expansion in an azimuth direction of echo, and the longer the transmitted pulse width, the larger the expansion in a distance direction of echo. Therefore, due to the expansion of the horizontal beam width of a transmitted wave beam and a received wave beam formed by an antenna, even the same target which is enlarged in the azimuth direction and displayed at a position distant from a sweep center on a display, becomes smaller as the target approaches near a ship carrying the radar apparatus (near the center). This tendency becomes more significant as the resolution of a display is increased (a smaller size of each pixel). In a display having such a high resolution, a target near the position of the own ship is displayed as having a considerably small size. When a sea surface reflection removing process is performed, the size of a target is further reduced due to an influence of the process, so that the target size reduction near the center becomes more significant, resulting in a significant reduction in visibility.

As a radar apparatus which solves such a problem, there is an apparatus which, after drawing an image at a pixel where a target is present, following this write operation, accesses again a pixel adjacent thereto in a direction substantially opposite to a sweep moving direction in a rectangular coordinate system, compares data already stored at the adjacent pixel with the current input data, and writes the greater data into the adjacent pixel (see, for example, Patent Documents 1 and 2).

[Patent Document 1] JP No. 2648983 B
[Patent Document 2] JP No. 2003-28950 A

However, in such a conventional radar apparatus, access (drawing) is performed with respect to the same pixel a plurality of times, so that the number of times of access to an image memory during one cycle of sweeping increases. Therefore, a time required to access the image memory increases with an increase in the number of pixels to be enlarged. Here, when display is performed on a high-resolution display, since each pixel in the image memory also inevitably becomes smaller, the number of pixels to be enlarged increases, so that a time required to write detected image data into the image memory increases. On the other hand, in recent years, some radar apparatuses have an antenna having a high rotational speed so as to support high-speed ships, for example. Therefore, when an attempt is made to perform the above-described enlargement/display process in such a high-speed antenna rotation type radar apparatus, it is highly likely that there is not an enough time to write data into the image memory, so that the entire image memory cannot be updated during one cycle of sweeping.

In conventional radar apparatuses, detected image data is enlarged only in the azimuth direction, so that the shape of a target displayed on a display differs from its actual shape, i.e., becomes unnatural.

Also in conventional radar apparatuses, detected image data is enlarged irrespective of the size of a target, so that detected image data which does not require enlargement is also enlarged, and therefore, display resolution is reduced more than necessary.

An object of the present invention is to provide a radar apparatus in which a rate at which detected image data is written into an image memory, is not reduced, irrespective of the enlarged amount of the detected image data, and like apparatuses thereto.

Another object of the present invention is to provide a radar apparatus which can obtain an enlarged image, depending on detected data (detected signal) of a target, by enlarging detected image data in two-dimensional directions, and like apparatuses thereto.

Still another object of the present invention is to provide a radar apparatus which can reliably display a target around a ship carrying the radar (own ship) without enlarging detected image data when it is not required, and like apparatuses thereto.

DISCLOSURE OF INVENTION

The present invention provides a radar apparatus comprising a coordinate converter for converting detected data at each sample point obtained in a polar coordinate system into a rectangular coordinate system, a detected image data generator for generating detected image data corresponding to each pixel in an image memory based on the detected data, and an image memory for storing detected image data output from the detected image data generator. The apparatus comprises data shifter for shifting detected image data input from the detected image data generator with predetermined timing and outputting the detected image data, and azimuth direction detected image data corrector for comparing detected image data of a current sweep from the detected image data generator with detected image data of a previous sweep from the data shifter at the same position in a sweep distance direction, and outputting a maximum value of the pieces of detected image data as detected image data of the current sweep.

In this configuration, the data shifter shifts detected image data from the detected image data generator, depending on predetermined timing (an azimuth direction shift timing signal described below), and outputs resultant data. Specifically, detected image data of a current sweep is input with predetermined timing, and at the same time, a plurality of pieces of previous detected image data at the same distance on sweeps are output from the data shifter. Next, detected image data at the same position in a sweep distance direction of a plurality of sweeps including the detected image data thus obtained of the current sweep are compared. When the detected image data of the current sweep is smaller than previous detected image data before shifting, the detected image data of the current sweep is replaced with detected image data of a previous sweep. Thereby, the previous sweep and the current sweep have the same detected image data, and as a result, detected image data of a pixel corresponding to the previous sweep is enlarged into pixels adjacent in a sweep rotational direction. Since this operation is repeatedly performed, the number of pixels for enlargement is determined, depending on the number of sweeps to be shifted. For example, when detected image data of two previous sweeps are shifted, original detected image data indicating a target is enlarged by two pixels in the sweep rotational direction.

In the present invention, the azimuth direction detected image data corrector comprises a correction stopper for, when a predetermined number or more of consecutive pieces of detected image data greater than or equal to a predetermined threshold value are present over a plurality of sweeps at the same position in a distance direction, stopping replacement of detected image data of a current sweep with detected image data of a previous sweep based on a sweep on which detected image data at the same position in the distance direction has a value less than the threshold value.

With this configuration, when there are consecutive pieces of detected image data greater than or equal to a predetermined threshold value at the same position in the sweep distance direction, extending over a predetermined number or more of sweeps, the correction stopper provides a predetermined value ("0", etc.) which is smaller than the threshold value to the detected image data with azimuth direction shift timing following azimuth direction shift timing with which the consecutive pieces of detected image data greater than or equal to the predetermined threshold value are ended. Thereby, detected image data is not enlarged in the sweep azimuth direction (sweep moving direction) immediately after a predetermined number or more of consecutive pieces of detected image data at the same position in the sweep distance direction are ended, irrespective of the number of sweeps to be shifted by the data shifter.

In the present invention, the radar apparatus comprises a distance direction detected image data corrector for comparing a predetermined number of consecutive pieces of detected image data in the distance direction on the same sweep, and outputting most peripheral detected image data of the pieces of detected image data as a maximum value the consecutive pieces of detected image data.

With this configuration, most peripheral detected image data of consecutive pieces of detected image data present on the same sweep is compared with detected image data which is present closer to the center than the most peripheral detected image and within a predetermined range. When the detected image data closer to the center is greater than the most peripheral detected image data, a value of the detected image data closer to the center is provided as the most peripheral detected image data. Thereby, the most peripheral detected image data has the same value as that of predetermined detected image data present closer to the center than the most peripheral detected image data. As a result, the detected image data is enlarged in the sweep distance direction.

In the present invention, the radar apparatus comprises a selector for selecting the number of sweeps to be shifted by the data shifter.

With this configuration, by selecting the number of sweeps to be shifted by the data shifter using the selector, the number of sweeps to be compared at the time point of generating detected image data of a current sweep (newest sweep) is determined. As described above, an enlarged amount in the azimuth direction depends on the number of sweeps to be compared, i.e., the number of sweeps to be shifted. Therefore, by selecting the number of sweeps, the number of pixels by which detected image data is enlarged in the sweep azimuth direction is selected.

In the present invention, the selector selects the number of pieces of detected image data to be compared by the distance direction detected image data corrector.

With this configuration, the selector selects the number of pieces of detected image data to be compared by the distance direction detected image data corrector, thereby determining the number of pieces of detected image data to be compared at the time point of generating detected image data at a certain sample point on a sweep. As described above, an enlarged amount in the distance azimuth direction depends on the detected image data to be compared, i.e., the number of pieces of detected image data to be shifted. Therefore, by selecting the number of pieces of detected image data, the number of pixels by which detected image data is enlarged in the sweep distance direction is selected.

According to the present invention, detected image data of a target can be enlarged without increasing the number of times of access to an image memory, thereby making it possible to display a detected image without decreasing image drawing speed. In other words, even when high speed drawing is required, a target near an own ship can be enlarged and displayed, and it is possible to prevent failure of updating an image within one cycle of sweeping. Therefore, a radar apparatus capable of reliably and clearly displaying a target, and like apparatuses thereto, can be configured.

According to the present invention, the enlarged amount of detected image data is limited, so that an originally large detected image of a target is prevented from being enlarged more than necessary. Therefore, a radar apparatus capable of preventing a reduction in display resolution more than necessary, and like apparatuses thereto, can be configured.

According to the present invention, an image is enlarged in a sweep azimuth direction as well as in a distance direction. Therefore, a radar apparatus which displays a detected image having a shape corresponding to an original target, resulting in excellent visibility, and like apparatuses thereto, can be configured.

According to the present invention, the enlarged amount of detected image data can be selected. Therefore, a radar apparatus capable of enlarging a detected image of a target, depending on a size requested by the operator, and like apparatuses thereto, can be configured.

BRIEF DESCRIPTION OF DRAWINGS

FIG. 2 includes a block diagram illustrating a configuration of a W data generator 9 and a block diagram illustrating target data detecting sections 91 and 94.

FIG. 4 is a logic circuit diagram of an azimuth direction enlargement permitting signal calculator 927.

FIG. 7 is a diagram illustrating an image memory, sample points of sweeps (points where detected image data is present), an enlarged range in the azimuth direction, and an enlarged range in the distance direction.

DESCRIPTION OF THE INVENTION

A radar apparatus according to an embodiment of the present invention will be described with reference to the accompanying drawings.

Figure 1:
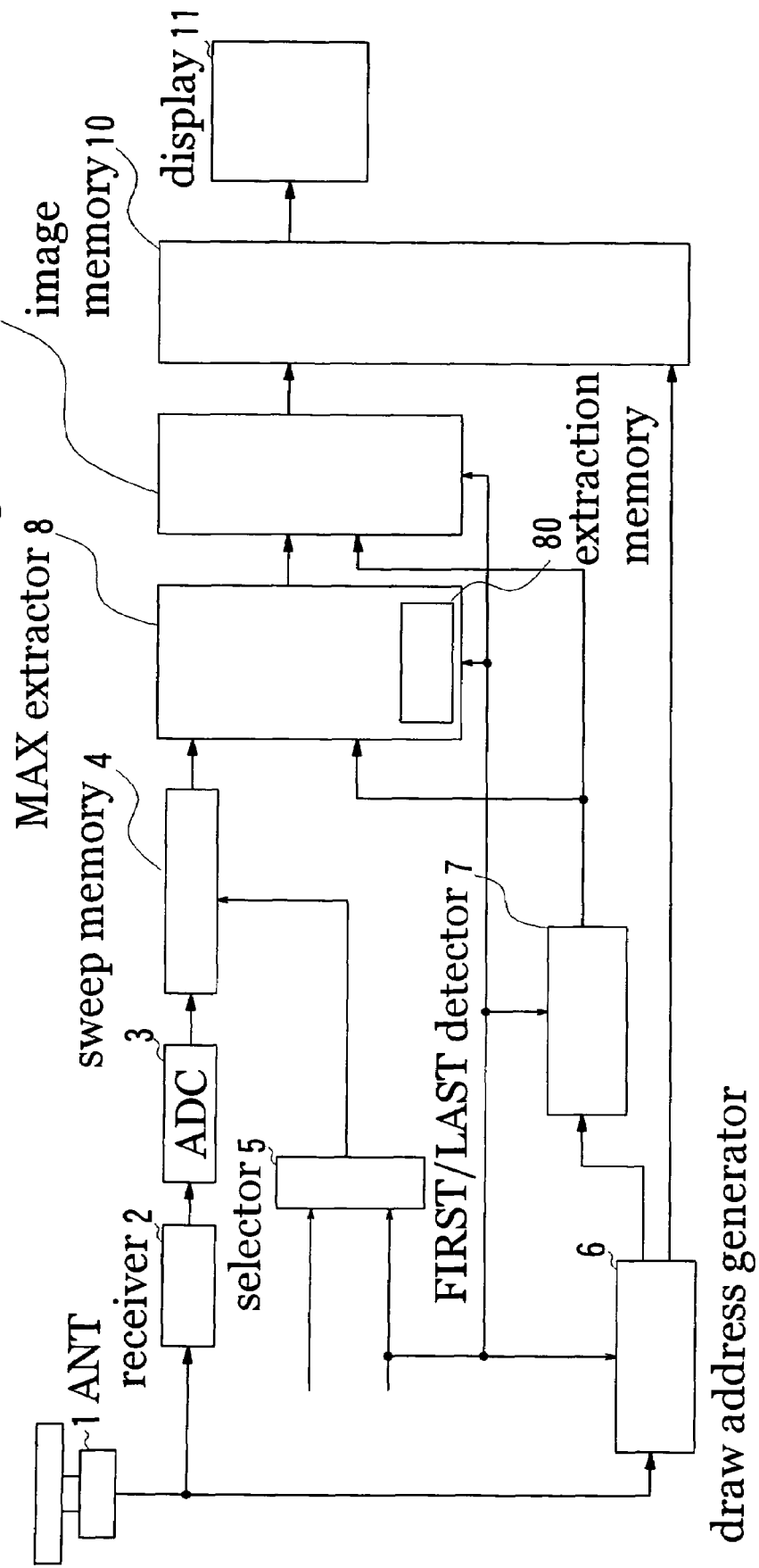
FIG. 1 is a block diagram illustrating a main portion of a radar apparatus of an embodiment of the present invention.

FIG. 1 is a block diagram illustrating a main portion of the radar apparatus of this embodiment.

A radar antenna 1 transmits pulsed radio waves (transmitted pulse signal) to the outside while rotating in predetermined rotation cycles on a horizontal plane during a transmission time interval. Also, the radar antenna 1 receives radio waves (detected signal) reflected from a target in a polar coordinate system during a reception time interval, and outputs the detected signal to a receiver 2, and also outputs sweep angle data (antenna angle θ) to a draw address generator 6.

The receiver 2 detects the detected signal from the radar antenna 1, and subjects the detected signal to a sea surface reflection suppressing (STC) process or the like, followed by amplification, and outputs a resultant signal to an AD conversion section 3.

The AD conversion section 3 samples this analog detected signal in predetermined cycles so as to convert the analog signal into digital detected data. One sweep of detected data thus converted into a digital form is written into a sweep memory 4 in real time, and this one sweep of data is output from the sweep memory 4 to a MAX extractor 8 by the time when detected data obtained by the next transmission is written again into the sweep memory 4.

A selector 5 receives a write clock signal (hereinafter simply referred to as a "W clock") and a read clock signal (hereinafter referred to as a "R clock"), and outputs the W clock when detected data is to be written into the sweep memory 4, and the R clock when detected data is to be read out from the sweep memory 4. As used herein, the W clock is a clock having a cycle corresponding to a detection distance, and the R clock is a clock which is used when detected data read out from the sweep memory 4 is subjected to a process described below and resultant data is drawn into an image memory 10.

The draw address generator 6 ("coordinate converter" of the present invention) creates addresses which designate pixels in the image memory 10 arranged in a corresponding rectangular coordinate system, based on an antenna angle θ (where a predetermined direction is used as a reference) and a read position r in the sweep memory 4, directing outward from a rotation center of a sweep as a start address, and outputs the addresses to the image memory 10.

Note that, specifically, the draw address generator 6 is composed of hardware which realizes the following expressions.

$$X = Xs + r \cdot \sin\theta$$

$$Y = Ys + r \cdot \cos\theta$$

X, Y: an address designating a pixel in the image memory
Xs, Ys: the center address of a sweep
r: a distance from the center
θ: the angle of a sweep (antenna)

A FIRST/LAST detector 7 detects timing with which a sweep first or last accesses each pixel of the image memory 10 which is represented in the rectangular coordinate system and is set by the draw address generator 6, and outputs the detected timing as a FIRST signal or a LAST signal to the MAX extractor 8 and a W data generator 9, within one cycle of sweeping. As used herein, the timing with which a sweep first accesses a pixel refers to timing with which a sample point on the sweep (i.e., a point where detected data is present) first accesses the pixel. As used herein, the timing with which a sweep last accesses a pixel refers to timing with which a sample point on the sweep (i.e., a point where detected data is present) last accesses the pixel.

The FIRST/LAST signal is detected based on a signal which is generated during a calculation process for converting polar coordinate system data into rectangular coordinate system data.

The MAX extractor 8, which corresponds to "detected image data generator" of the present invention, comprises an extraction memory 80 having a capacity corresponding to detected data on one sweep, and writes detected data read from the sweep memory 4 into the extraction memory 80 with the timing of the FIRST signal, and during a period of time other than the timing of the FIRST signal, compares detected data corresponding to the pixel read from the sweep memory 4 with detected data stored in the extraction memory 80 to detect the maximum value, and writes the maximum value into the extraction memory 80 again. Thereafter, the MAX extractor 8 outputs detected data having the maximum value (MAX data) written in the extraction memory 80, as detected image data, to the W data generator 9 with the timing of the LAST signal.

As illustrated in FIG. 2(a), the W data generator 9 comprises an azimuth direction enlargement section 90a corresponding to "azimuth direction detected image data corrector" of the present invention, and a distance direction enlargement section 90b corresponding to "distance direction detected image data corrector" of the present invention. Here, FIG. 2(a) is a block diagram illustrating a configuration of the W data generator. Note that the block diagram will be specifically described below.

When drawing for updating is performed, the azimuth direction enlargement section 90a calculates a maximum value of past input data corresponding to a plurality of pixels adjacent to the pixel in a direction opposite to a sweep rotational direction at the same distance (r) and new input data of a pixel to be currently drawn and updated, and uses the maximum value as data to be written into the pixel to be drawn and updated.

Therefore, when a pixel corresponding to a point at a distance r from the sweep center is enlarged into (m+1) pixels in the azimuth direction, there are m columns of memory each of which has a capacity corresponding to the enlarged distance and to which addresses are assigned in the distance direction, and at the time of drawing and updating a pixel positioned at an address r (LAST timing), new input data of a pixel to be drawn is stored into the address r of the first-column memory, and at the same time, data already stored is written into the address r of the second-column memory. In other words, data stored in the $n^{th}$-column memory is successively shifted to the address r of the $(n+1)^{th}$-column memory, and data stored in the last column is deleted.

For example, when there are two columns (m=2) of memory, it is assumed that new input data of a pixel to be drawn and updated which is positioned at the address r is detected image data, data read from the address r of the first-column memory is past detected image data A, and data read from the address r of the second-column memory is past detected image data B. In this case, the maximum value of the three pieces of data, i.e., the detected image data, the past detected image data A, and the past detected image data B, is an output of the azimuth direction enlargement section 90a, which is in turn input to the next-stage distance direction enlargement section 90b.

As used herein, regarding the azimuth direction shift timing, azimuth direction shift is performed when a point of interest at the distance r on a following sweep is compared with a point at the same distance r on a preceding sweep in a rectangular coordinate system, and the coordinate points corresponding to the two points are different from each other in the rectangular coordinate system.

In this embodiment, the maximum value of all data corresponding to each pixel is assumed to be new input data of the W data generator. Since the maximum value is determined with the LAST timing of last access to a pixel, the azimuth direction shift timing is also determined using the LAST signal. Therefore, timing with which a pixel is drawn is the same as the azimuth direction shift timing.

The distance direction enlargement section 90b performs enlargement in a distance direction for each sweep based on detected image data which has been subjected to the azimuth direction enlargement process by the azimuth direction enlargement section 90a. For example, when enlargement is performed by n pieces in a distance direction using the R clock, image data at each distance is assumed to be the maximum value of one piece of output data at the distance of the azimuth direction enlargement section 90a and (n−1) pieces of output data adjacent on the sweep center side from the distance of the azimuth direction enlargement section 90a (a total of n pieces).

Specifically, the output of the azimuth direction enlargement section 90a is successively shifted using the R clock, and the maximum value of n pieces of data at respective distances (r+1), (r+2), . . . , and (r+n) of the azimuth direction enlargement section 90a is assumed to be image data at a position corresponding to at a distance r+n.

This operation is successively repeated, directing outward from the sweep center.

The image memory 10 is a memory which has a capacity which can store detected image data corresponding to one cycle of an antenna, i.e., one cycle of sweeping. The detected image data which is generated and enlarged in the azimuth direction and the distance direction by the W data generator 9 is drawn into pixels whose addresses are designated by the draw address generator 6. Thereafter, when raster scanning is performed with respect to the display by a display control section (not shown), detected image data drawn in the image memory 10 is read out with high speed in synchronization with the raster operation, and a detected image having a luminance and a color corresponding to the data is displayed on a display 11.

Next, the W data generator 9 will be specifically described with reference to FIGS. 2 to 7.

As described above, the W data generator 9 is composed of the azimuth direction enlargement section 90a and the distance direction enlargement section 90b. The azimuth direction enlargement section 90a is composed of a target data detecting section 91, an azimuth direction data extractor 92, and a maximum value detecting section 93. The distance direction enlargement section 90b is composed of a target data detecting section 94, two shift registers 95a and 95b connected in series, and a maximum value detecting section 96.

The target data detecting section 91 comprises a calculation circuit 901 and a selector 902 as illustrated in FIG. 2(b). FIG. 2(b) is a block diagram illustrating the target data detecting sections 91 and 94.

The calculation circuit 901 receives detected image data from the MAX extractor 8, and a predetermined threshold value. For example, assuming that the number of bits of the detected image data is 5 bits (32 levels), a value "8" which can be generated when a target is present is input as the threshold value. The calculation circuit 901 compares the input detected image data with the threshold value, and when the detected image data is greater than or equal to the threshold value, a permission signal is output to the selector 902.

When receiving the permission signal from the calculation circuit 901, the selector 902 outputs the detected image data as it is. When not receiving the permission signal from the calculation circuit 901, i.e., the detected image data is smaller than the threshold value, the selector 902 does not output the input detected image data and outputs "0" as detected image data.

With such an operation, the target data detecting circuit 91 determines whether or not there is a target, and also functions as a filter which prevents data, such as noise smaller than the threshold value or the like, from being enlarged by the following-stage circuit.

Figure 3:
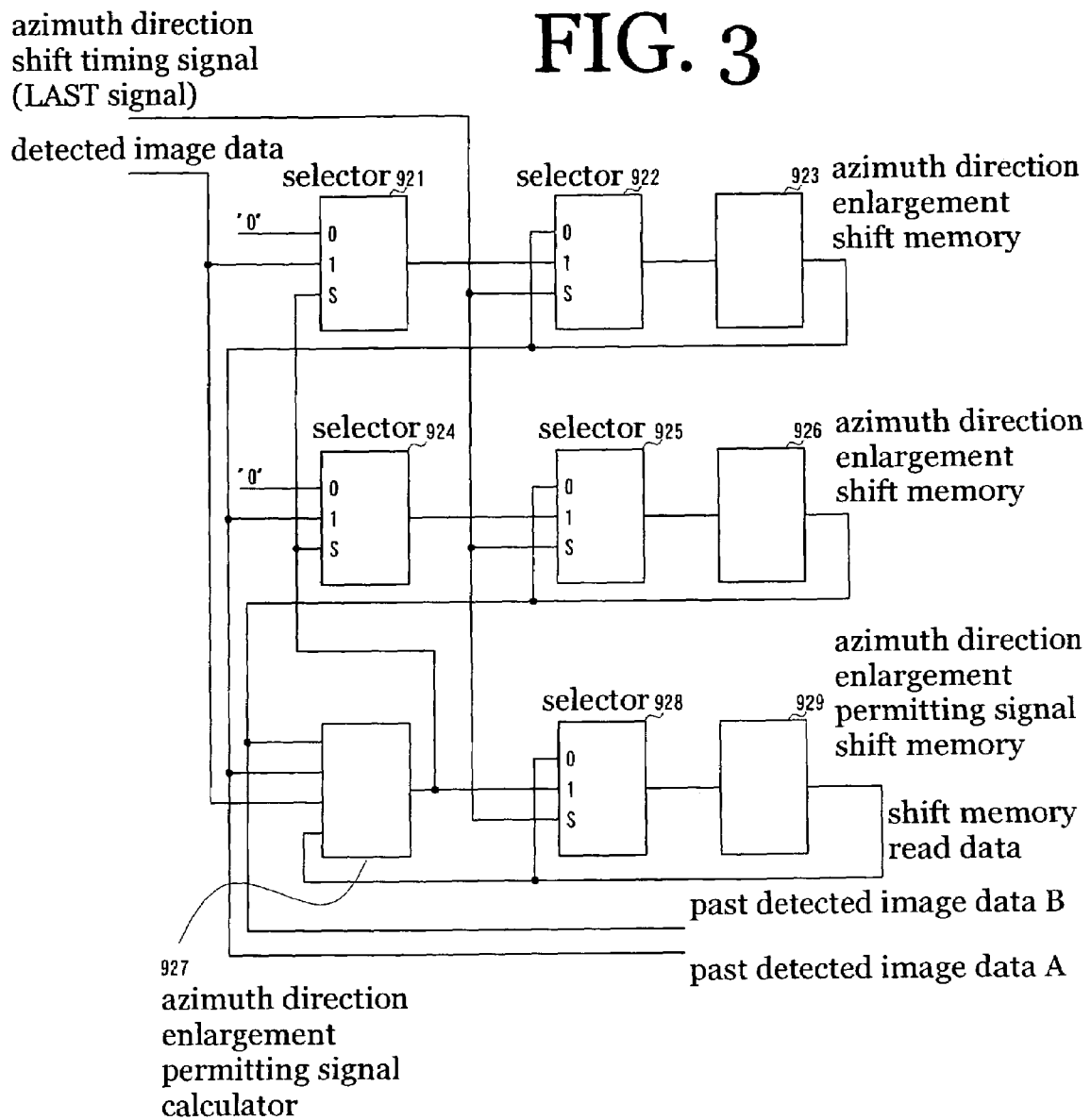
FIG. 3 is a block diagram illustrating an azimuth direction data extractor 92.
Figure 5A:
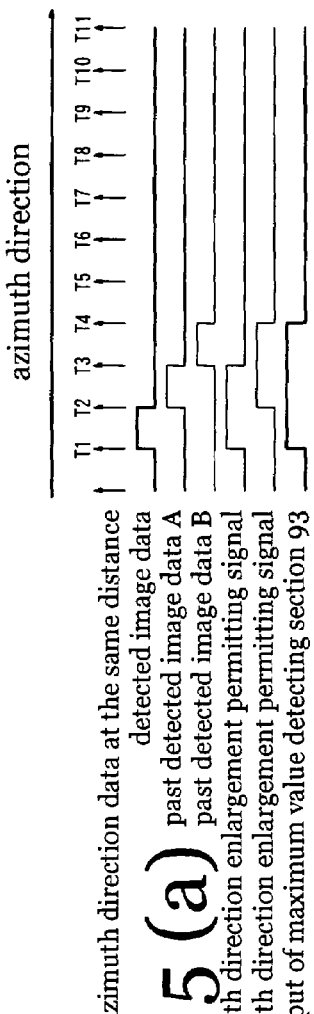
FIG. 5 is a diagram illustrating each piece of detected image data, an azimuth direction enlargement permitting signal, a delayed azimuth direction enlargement permitting signal, and azimuth direction enlargement resultant data, when enlargement is performed in an azimuth direction.
Figure 5B:
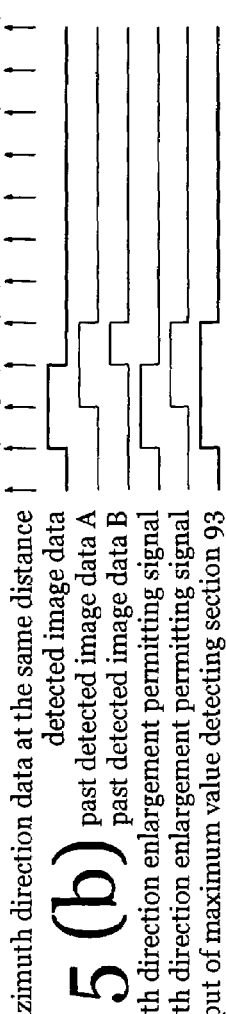
Figure 5C:
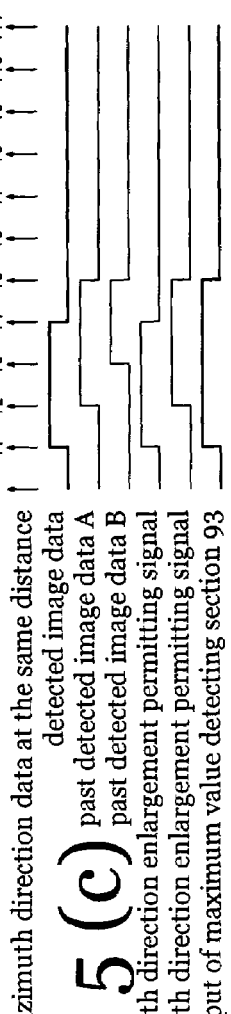
Figure 5D:
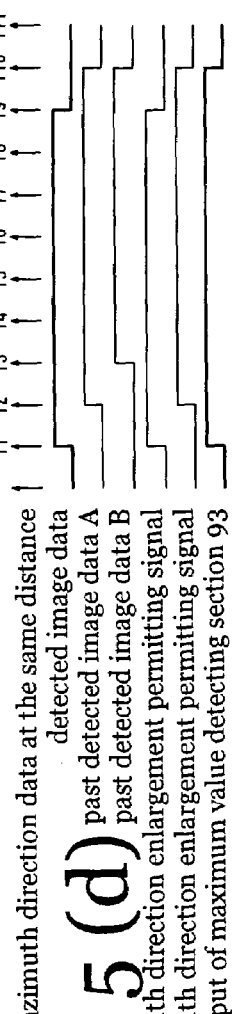

The azimuth direction data extractor 92 has a configuration illustrated in FIG. 3. FIG. 3 is a block diagram illustrating the azimuth direction data extractor 92.

When detected image data is input from the target detecting section 91 to the azimuth direction data extractor 92, the detected image data is input to a selector 921 and an azimuth direction enlargement permitting signal calculator 927.

The azimuth direction enlargement permitting signal calculator 927 is composed of a logic circuit of FIG. 4. FIG. 4 is a logic circuit diagram of the azimuth direction enlargement permitting signal calculator 927.

In the azimuth direction enlargement permitting signal calculator 927, detected image data of a current sweep, past detected image data A described below (detected image data of the previous sweep), and past detected image data B (detected image data of the second previous sweep) are input to OR gates 71 to 73, respectively, to determine whether or not data (i.e., "1") is present in each bit, and if data is present, the OR gates 71 to 73 individually output a data presence signal.

Next, a data presence signal from the OR gate 71 and the inverse of a data presence signal from the OR gate 72 are input to an AND gate 74. When a data presence signal is input from the OR gate 71 and a data presence signal is not input from the OR gate 72, the AND gate 74 outputs a first permission signal. In other words, when new detected image data is present and past detected image data A is not present, the first permission signal is output.

A data presence signal from the OR gate 72 and the inverse of a data presence signal from the OR gate 73 are input to an AND gate 75. When a data presence signal is input from the OR gate 72 and a data presence signal is not input from the OR gate 73, the AND gate 75 outputs a second permission signal. In other words, when past detected image data A is present and past detected image data B is not present, the second permission signal is output.

A data presence signal from the OR gate 71 and an azimuth direction enlargement permitting signal (shift memory read data of FIG. 3) obtained when the previous detected image data (one step before) is input from an azimuth direction enlargement permitting signal shifting memory 929 (when past detected image data A is input as new detected image data), are input to an AND gate 76. When a data presence signal is input from the OR gate 71 and an azimuth direction enlargement permitting signal is input from the azimuth direction enlargement permitting signal shifting memory 929, the AND gate 76 outputs a third permission signal. In other words, when new detected image data is present and the previous azimuth direction enlargement permitting signal is present, a third permission signal is output.

The outputs of the AND gates 74 to 76 are input to an OR gate 77. The OR gate 77 outputs an azimuth direction enlargement permitting signal when a permission signal (the first to third permission signals) is input from any of the AND gates 74 to 76. Specifically, when new detected image data is present and past detected image data A is not present, when past detected image data A is present and past detected image data B is not present, or when new detected image data is present and the previous azimuth direction enlargement permitting signal is present, the OR gate 77 outputs an azimuth direction enlargement permitting signal. If otherwise, the OR gate 77 does not output an azimuth direction enlargement permitting signal.

The output of the azimuth direction enlargement permitting signal calculator 927 and the output of the azimuth direction enlargement permitting signal shifting memory 929 are input to a selector 928. When receiving an azimuth direction shift timing signal, the selector 928 outputs the output of the azimuth direction enlargement permitting signal calculator 927 to the azimuth direction enlargement permitting signal shifting memory 929. When not receiving an azimuth direction shift timing signal, the selector 928 outputs the output of the azimuth direction enlargement permitting signal shifting memory 929 back to the azimuth direction enlargement permitting signal shifting memory 929.

When it is shift timing, the output of the azimuth direction permission signal calculator 927 is written into the azimuth direction enlargement permitting signal shifting memory 929. When it is not shift timing, the output of the azimuth direction enlargement permitting signal shifting memory 929 is written back to hold the contents. The output of the azimuth direction enlargement permitting signal shifting memory 929 is input to the azimuth direction enlargement permitting signal calculator 927 and the selector 928.

Detected image data and the output of the azimuth direction enlargement permitting signal calculator 927 are input to the selector 921. When receiving an azimuth direction enlargement permitting signal, the selector 921 outputs the detected image data to a selector 922. When not receiving an azimuth direction enlargement permitting signal, the selector 921 outputs "0".

The selector 922 receives the output of the selector 921 and the output of an azimuth direction enlargement shift memory 923. When receiving an azimuth direction shift timing signal, the selector 922 outputs detected image data or "0" to the azimuth direction enlargement shift memory 923. When not receiving an azimuth direction shift timing signal, the selector 922 outputs a signal output from the azimuth direction enlargement shift memory 923 back to the azimuth direction enlargement shift memory 923.

The azimuth direction enlargement shift memory 923 delays the input detected image data or "0", depending on the shift timing of an azimuth direction shift timing signal, and outputs the input detected image data or "0" to the selector 922 and a selector 924, and outputs the detected image data or "0" as past detected image data A.

The selector 924 receives the detected image data (past detected image data A) and data "0" which are delayed once. When receiving an azimuth direction enlargement permitting signal, the selector 924 outputs the past detected image data A to a selector 925. When not receiving an azimuth direction enlargement permitting signal, the selector 924 outputs "0".

The selector 925 receives the output of the selector 924 and the output of an azimuth direction enlargement shift memory 926. When receiving an azimuth direction shift timing signal, the selector 925 outputs the past detected image data A or "0" to the azimuth direction enlargement shift memory 926. When not receiving an azimuth direction shift timing signal the selector 925 outputs a signal output from the azimuth direction enlargement shift memory 926 back to the azimuth direction enlargement shift memory 926.

The azimuth direction enlargement shift memory 926 delays the input past detected image data A or "0", depending on the shift timing of the azimuth direction shift timing signal, and outputs the past detected image data A or "0", to the selector 925, and outputs the detected image data or "0" as past detected image data B.

With such a configuration, the azimuth direction data extractor 92 receives new detected image data with azimuth direction shift timing, and outputs past detected image data A which is delayed once and past detected image data B which is delayed twice. Specifically, when detected image data of a sample point at a predetermined distance position of a current sweep is input, the previous detected image data corresponding to a pixel adjacent in a direction opposite to the sweep rotational direction and at the same position in the sweep distance direction, and the second previous detected image data corresponding to the pixel adjacent in the direction opposite to the sweep rotational direction and at the same position in the sweep distance direction, are output with respect to a pixel corresponding to the detected image data.

Note that, in the above description, a block composed of the selectors 921 and 924, the azimuth direction enlargement permitting signal calculator 927, the selector 928, and the azimuth direction enlargement permitting signal shifting memory 929, corresponds to "correction stopper" of the present invention, and the selectors 922 and 925, and the azimuth direction enlargement shift memories 923 and 926, correspond to "data shifter" of the present invention.

The maximum value detecting section 93 receives and compares detected image data and past detected image data A and B from the azimuth direction data extractor 92, and outputs data having the greatest value. With such a configuration, if the detected image data is greatest, the detected image data is output as it is. If past detected image data A one cycle before is greatest, the detected image data is replaced with the past detected image data A, which is in turn output. If the past detected image data B two cycles before is greatest, the detected image data is replaced with the past detected image data B, which is in turn output.

An azimuth direction enlargement operation of the azimuth direction enlargement section 90*a* thus configured will be described with reference to FIGS. 5 and 7. FIG. 5 illustrates each piece of detected image data, an azimuth direction enlargement permitting signal, a delayed azimuth direction enlargement permitting signal, and azimuth direction enlargement resultant data (data output by the azimuth direction enlargement section), when enlargement is performed in the azimuth direction. (a) indicates the case where only one pixel of detected image data is present in the azimuth direction, (b) indicates the case where two consecutive pixels of detected image data are present in the azimuth direction, (c) indicates the case where three consecutive pixels of detected image data are present in the azimuth direction, and (d) indicates the case where eight consecutive pixels of detected image data are present in the azimuth direction. FIG. 7 is a diagram illustrating an image memory, sample points of sweeps (points where detected image data is present), an enlarged range in the azimuth direction, and an enlarged range in the distance direction.

For example, as illustrated in FIGS. 5(*a*) and 7, when the azimuth direction shift timing is "1" at a distance position Y1 of a sweep X1, and only with this timing, detected image data is present, the detected image data is drawn at a pixel D(1, 3) corresponding to the detected image data. In this case, the detected image data is present with azimuth direction shift timing T1, and before that, no detected image data is present on the distance position Y1. Therefore, an azimuth direction enlargement permitting signal is generated, and the above-described shift operation is performed with respect to the detected image data. Next, since no detected image data is present at the distance position Y1 of a sweep X2 with azimuth direction shift timing T2, but the detected image data present at the distance position Y1 of the sweep X1 with the azimuth direction shift timing T1 is delayed by the azimuth direction data extractor 92 and is output as past detected image data A, the maximum value detecting section 93 selects and outputs the past detected image data A. As a result, the same detected image data as that of the pixel D(1, 3) is drawn at a pixel D(2, 2) corresponding to the azimuth direction shift timing T2 at the distance position Y1 of the sweep X2. Also in this case, since the past detected image data A (detected image data delayed by one cycle) and no past detected image data B is present, an azimuth direction enlargement permitting signal is output, and a further shift operation is performed.

Next, since no detected image data is present at the distance position Y1 of a sweep X3 with azimuth direction shift timing T3, but the detected image data present at the distance position Y1 of the sweep X1 with the azimuth direction shift timing T1 is delayed by the azimuth direction data extractor 92 and is output as past detected image data B, the maximum value detecting section 93 selects and outputs the past detected image data B. As a result, the same detected image data as that of the pixel D(1, 3) is drawn at a pixel D(3, 2) corresponding to the azimuth direction shift timing T3 at the distance position Y1 of the sweep X3. In this case, since there is no case where an azimuth direction enlargement permitting signal is generated, an azimuth direction enlargement permitting signal is not generated, and a further shift operation is not performed.

By performing the above-described operation, the detected image data of the pixel D(1, 3) can be enlarged into three pixels in the sweep azimuth direction.

Next, in the case illustrated in FIG. 5(*b*), i.e., when two pieces of detected image data are consecutively present at the same distance, an operation with the azimuth direction shift timing T1 is the same as that of FIG. 5(*a*). Next, since detected image data is present with the azimuth direction shift timing T2, and detected image data present with the azimuth direction shift timing T1 is also shifted and output by the azimuth direction data extractor 92, the maximum value detecting section 93 outputs one of these pieces of data which is the greater. In other words, detected image data is output. In this case, since detected image data is present with the azimuth direction shift timing T2, and the previous azimuth direction enlargement permitting signal is also output from the azimuth direction enlargement permitting signal shifting memory, also in this case an azimuth direction enlargement permitting signal is output and the above-described shift operation is performed with respect to the detected image data. Next, since no detected image data is present with the azimuth direction shift timing T3, but the detected image data present with the azimuth direction shift timing T1 and the detected image data present with the azimuth direction shift timing T2 are output from the azimuth direction data extractor 92, the maximum value detecting section 93 outputs detected image data as in the case of the azimuth direction shift timing T2. In this case, since the condition that an azimuth direction enlargement permitting signal is output is not satisfied, an azimuth direction enlargement permitting signal is not output, and "0" is input to the azimuth direction enlargement shift memories 923 and 926. In other words, the above-described shift operation is not performed with respect to the detected image data. Next, since no detected image data is present with azimuth direction shift timing T4, and no detected image data is output from the azimuth direction data extractor 92, no detected image data is output from the maximum value detecting section 93. Thereby, two consecutive pixels of detected image data in the sweep azimuth direction are enlarged into three pixels.

Next, an operation of FIG. 5(*d*) will be described (since operations of FIGS. 5(*c*) and 5(*d*) are similar to each other, the operation of FIG. 5(*c*) will not be described).

In the case of FIG. 5(*d*), i.e., when eight pieces of detected image data are consecutively present at the same distance, operations with the azimuth direction shift timing T1 and T2 are similar to that of FIG. 5(*a*). In the case of azimuth direction shift timing T3 to T8, since new detected image data is present, and an azimuth direction enlargement permitting signal which is delayed once is present, an azimuth direction enlargement permitting signal continues to be output, and the above-described shift operation is repeated. And, since no new detected image data is present with azimuth direction shift timing T9, a new azimuth direction enlargement permitting signal is not output from the azimuth direction enlargement permitting signal calculator 927 and "0" is output from the selectors 921 and 924. With the azimuth direction shift timing T10, "0" is written into the azimuth direction enlargement shift memories 923 and 926. However, since past detected image data A and B are output from the azimuth direction enlargement shift memories 923 and 926 with the azimuth direction shift timing T9, detected image data corresponding to the past detected image data A and B is drawn at a pixel corresponding to the azimuth direction shift timing T9. Also, since no new image data is present on a sweep X10, a new azimuth direction enlargement permitting signal is not output from the azimuth direction enlargement permitting signal calculator 927, and "0" is output from the selectors 921 and 924. With azimuth direction shift timing T11, "0" is written into the azimuth direction enlargement shift memories 923 and 926. Further, since "0" has been written into the azimuth direction enlargement shift memories 923 and 926 with the azimuth direction shift timing T10, signals output from these shift memories are "0". Thereby, "0" is input into a pixel corresponding to the azimuth direction shift timing T10. In other words, no enlarged image data is drawn. In this manner, detected image data originally indicating a large target is enlarged only by one pixel, so that enlargement is suppressed from being performed more than necessary.

Next, data output from the maximum value detecting section 93 is input to the target data detecting section 94 and the maximum value detecting section 96 of the distance direction enlargement section 90*b*.

The target data detecting section 94 has the same configuration as that of the target data detecting section 91 of the azimuth direction enlargement section 90*a*, and causes data smaller than a predetermined threshold value among the input data to be "0", and outputs data greater than or equal to the predetermined threshold value directly to the shift register 95*a*.

Specifically, the shift register 95*a* is composed of a D-./ .circuit, and delays input data, depending on the cycle of the R clock, and outputs resultant data to the maximum value detecting section 96 and the shift register 95*b*.

The shift register 95*b* is also composed of a D-F/F circuit, and further delays the data delayed by the shift register 95*a*, depending on the cycle of the R clock, and outputs resultant data to the maximum value detecting section 96.

The maximum value detecting section 96 receives data output from the azimuth direction enlargement section 90*a* and delayed data a and b delayed by the shift registers 95*a* and 95*b*, respectively, and outputs a maximum value of these data. Specifically, data at three adjacent sample points present on the same sweep are compared, and greatest data is output. Thereby, for example, when detected image data is input at a certain time point (sample point), and thereafter, data smaller than the detected image data are input two consecutive times in the sweep distance direction, detected image data at a sample point closest to the center is output three consecutive times from the maximum value detecting section 96 to from a pixel corresponding to the sample point closest to the center to a pixel corresponding to a sample point closest to the periphery. As a result, the detected image data of the pixel corresponding to the sample point closest to the center is enlarged by two pixels in the sweep distance direction and is displayed.

An operation of the distance direction enlargement section 90b will be described with reference to FIG. 6. Here, FIG. 6 illustrates data output from the azimuth direction enlargement section, data output from each shift register, and distance direction enlargement resultant data (data output from the distance direction enlargement section), when enlargement is performed in the distance direction. (a) indicates the case where only one pixel of detected image data is present in the distance direction, (b) indicates the case where two consecutive pixels of detected image data are present in the distance direction, (c) indicates the case where three consecutive pixels of detected image data are present in the distance direction, and (d) indicates the case where eight consecutive pixels of detected image data are present in the distance direction.

Figure 6A:
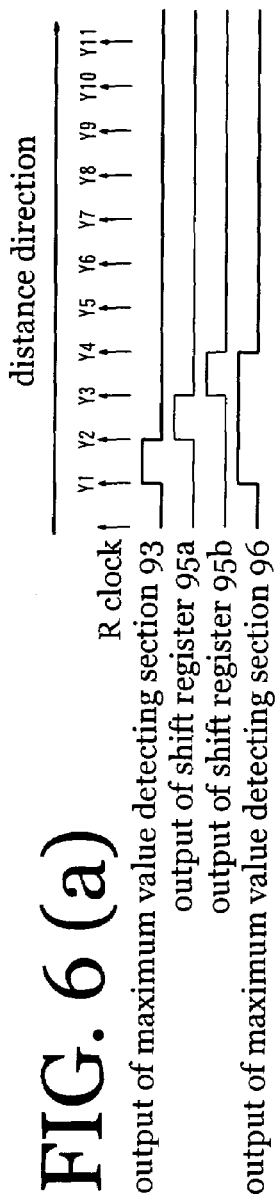
FIG. 6 is a diagram illustrating each piece of detected image data, data output from each shift register, and distance direction enlargement resultant data, when enlargement is performed in a distance direction.

For example, as illustrated in FIG. 6(a), when detected image data is present only at the distance position Y1 of the sweep X1, and no detected image data is present at the distance positions Y2 to Y4, no detected image data is present at the distance position Y2 of the sweep X1, but at this time point, the detected image data at the distance position Y1 has been input from the shift register 95a into the maximum value detecting section 96, and therefore, the maximum value detecting section 96 outputs the detected image data at the distance position Y1 of the sweep X1. Thereby, the same detected image data as that of a pixel corresponding to the distance position Y1 of the sweep X1 is drawn into a pixel corresponding to the distance position Y2 of the sweep X1. Next, also, no detected image data is present at the distance position Y3 of the sweep X1, but at this time point, the detected image data at the distance position Y1 has been input from the shift register 95b into the maximum value detecting section 96, the maximum value detecting section 96 outputs the detected image data at the distance position Y1 of the sweep X1. Thereby, the same detected image data as that of a pixel corresponding to the distance position Y1 of the sweep X1 is drawn into a pixel corresponding to the distance position Y3 of the sweep X1 as well. With such an operation, the detected image data of the pixel corresponding to the distance position Y1 of the sweep X1 can be enlarged by two pixels in the sweep distance direction.

Figure 6B:
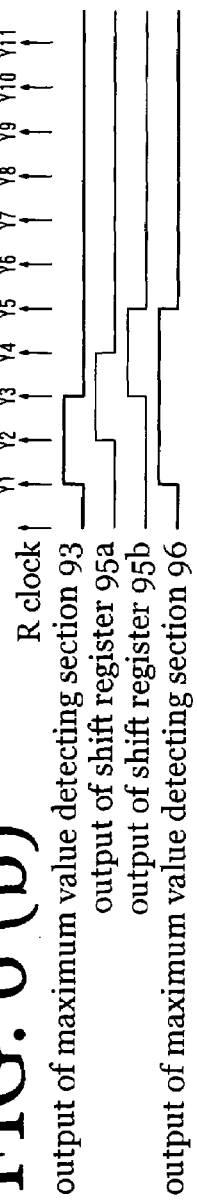
Figure 6C:
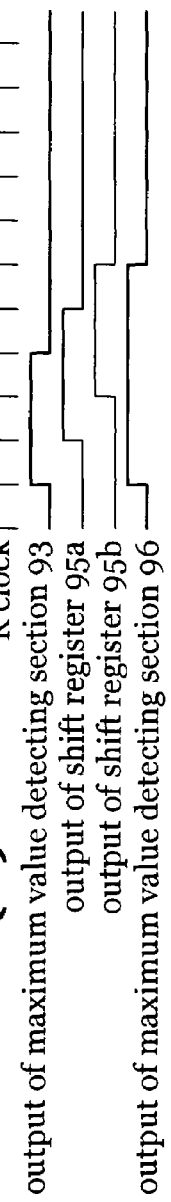
Figure 6D:
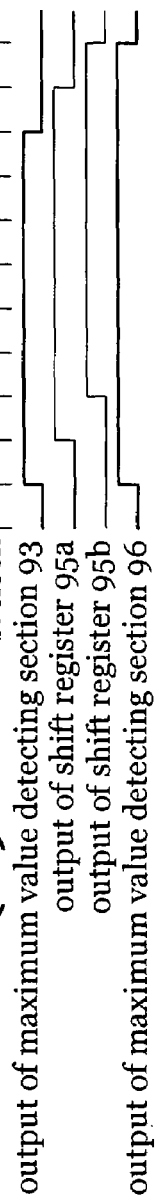

Next, an operation of FIG. 6(d) will be described (since operations of FIGS. 6(b), 6(c), and 6(d) are similar to the operation of FIG. 6(a), the operation of FIGS. 6(b) and 6(c) will not be described).

In the case of FIG. 6(d), i.e., when detected image data is present at eight sample points adjacent on a sweep in the distance direction, operations at the distance positions Y1 and Y2 are the same as that of FIG. 6(a). In the case of distance positions Y3 to Y8, new detected image data is present, and in addition, detected image data is output from the shift registers 95a and 95b, so that detected image data continues to be output within this range. Next, in the case of a distance position Y9, no new detected image data is input, but delayed detected image data is output from the shift registers 95a and 95b, so that the maximum value detecting section 96 outputs the detected image data. Next, in the case of a distance position Y10, no new detected image data is input, and no detected image data is output from the shift register 95a, but detected image data is output from the shift register 95b, so that the maximum value detecting section 96 outputs the detected image data. Next, in the case of a distance position Y11, no new detected image data is input and no detected image data is output from the shift registers 95a and 95b, so that the maximum value detecting section 96 outputs no detected image data.

Thus, in the distance direction enlargement section 90b thus configured, if detected image data is present at a certain distance position of a sweep, the detected image data can be enlarged by two pixels in the sweep distance direction and resultant data can be drawn into the image memory 10.

Such a distance direction enlargement operation is also performed with respect to a sweep whose detected image data has been enlarged in the azimuth direction. As a result, detected image data can be enlarged both in the azimuth direction and the distance direction. For example, in the case of FIG. 7, azimuth direction enlargement is performed from the sweep X1, directing toward the sweeps X2 and X3, and distance direction enlargement is performed on each of the sweeps X1, X2, and X3. As a result, as illustrated in FIG. 7, the detected image data of a pixel D(1, 3) is enlarged and drawn into the pixel D(1, 3), pixels D(2, 2) to (2, 4), pixels (3, 2) to (3, 4), a pixel D(4, 2), and a pixel D(4, 3).

The above-described operation is performed before drawing detected image data into an image memory. Therefore, even in when enlarged display is performed, the number of times of access to the image memory does not change.

With the above-described configuration, a radar apparatus can be configured in which, even when detected image data is small, the detected image data can be enlarged and displayed into a predetermined size, and a rate at which data is drawn from an image memory to a display does not decrease, and like apparatuses thereto can be configured.

If a predetermined number or more of pixels of detected image data are present in the sweep azimuth direction, an enlarged amount thereof can be limited. Therefore, a radar apparatus can be configured in which a small image is enlarged, and the enlargement of an originally large image is limited, resulting in excellent visibility and suppressing a reduction in display resolution, and like apparatuses thereto can be configured.

Since detected image data is enlarged both in the sweep azimuth direction and the sweep distance direction, it is possible to provide an enlarged image having a shape more similar to original detected image data than when enlargement is performed only in one direction, resulting in visibility for the operator.

Note that, in this embodiment, when target detected image data has a size of two pixels or less in the azimuth direction, the data is enlarged into three pixels in the azimuth direction, and when target detected image data has a size of three pixels or more, the data is enlarged by only one pixel. Alternatively, by increasing the number of azimuth direction enlargement shift memories, an image enlarged into a larger number of pixels can be formed.

In this embodiment, the amount of enlargement in the azimuth direction is determined, depending on the number of azimuth direction enlargement shift memories provided in the azimuth direction enlargement section 90a. Alternatively, the number of azimuth direction enlargement shift memories used by the control section may be set by the operator setting the enlarged amount using an operation section (not shown). With such a configuration, target detected image data can be enlarged by an enlarged amount which the user prefers, and can be displayed.

In this embodiment, two shift registers are provided in the distance direction enlargement section 90b so as to enlarge data by two pixels in the sweep distance direction. Alternatively, by changing the number of shift registers provided, the number of pixels by which data is enlarged can be set, depending on the number of shift registers provided.

In this embodiment, detected image data is enlarged in the azimuth direction and the distance direction irrespective of the distance from a sweep center (own ship's position). However, in a peripheral portion farther than a predetermined distance, detected image data having a predetermined number or less of pixels (e.g., only one pixel is present alone) may be set not to be enlarged. In this case, the enlargement process may be switched on/off with the following timing. Timing with which a sweep accesses a pixel in an image memory is counted using a counter or the like, and the enlargement process is not performed on and after the number of counts reaches a predetermined number. In other words, since echo has a spread corresponding to an antenna beam width, echo located at a distance from the center has a size extending over a plurality of pixels in the azimuth direction, and therefore, when only one pixel is detected in the azimuth direction, the detected image data is determined as noise or interference, so that the detected image data is not enlarged. With such a configuration, in a peripheral portion where detected image data with respect to a target originally has a large size in the azimuth direction, it is possible to prevent considerably small detected image data caused by noise from being enlarged. On the other hand, the enlargement process is performed in the vicinity of the center as described above, so that detected image data of a target can be reliably obtained in the vicinity of the center where detected image data with respect to a target is small. Thereby, a radar apparatus having excellent visibility, and like apparatuses thereto, can be configured.

INDUSTRIAL APPLICABILITY

The present invention can be applied to an apparatus, such as a radar apparatus, a sonar apparatus, or the like, which converts a detected signal received in a polar coordinate system into a rectangular coordinate system and stores resultant data into an image memory, and displays the data on a raster scan type display, and particularly an apparatus which enlarges and displays detected data obtained from the detected signal.

The invention claimed is:

1. A radar apparatus comprising:
    a coordinate converter that converts detected data at each sample point obtained in a polar coordinate system into a rectangular coordinate system;
    a detected image data generator that generates a pixel of detected image data based on each point of the converted detected data;
    an image memory that stores the generated pixels of detected image data;
    a data shifter that shifts detected image data input from the detected image data generator with predetermined timing and outputs the shifted detected image data; and
    an azimuth direction detected image data corrector that compares generated pixels of detected image data of a current sweep with shifted detected image data of a previous sweep at the same position in a sweep distance direction, and outputs a maximum value of pieces of detected image data as detected image data of the current sweep.

2. A radar apparatus according to claim 1, the azimuth direction detected image data corrector comprising:
    a correction stopper that, when a predetermined number or more of consecutive pieces of detected image data greater than or equal to a predetermined threshold value are present over a plurality of sweeps at the same position in a distance direction, stops replacement of detected image data of a current sweep with detected image data of a previous sweep based on a sweep on which detected image data at the same position in the distance direction has a value less than the threshold value.

3. A radar apparatus according to claim 1 or 2, the apparatus further comprising:
    a distance direction detected image data corrector that compares a predetermined number of consecutive pieces of detected image data in the distance direction on the same sweep, and outputs most peripheral detected image data of the pieces of detected image data as a maximum value of the consecutive pieces of detected image data.

4. A radar apparatus according to claim 3, the apparatus further comprising a selector that selects the number of sweeps to be shifted by the data shi tier.

5. A radar apparatus according to claim 4, wherein the selector selects the number of pieces of detected image data to be compared by the distance direction detected image data corrector.

6. A method of generating image data from radar detection data, the method comprising:
    converting detected data at each sample point obtained in a polar coordinate system into a rectangular coordinate system;
    generating a pixel of detected image data based on each point of the converted detected data;
    storing the generated pixels of detected image data;
    shifting the generated detected image data with predetermined timing;
    outputting the shifted detected image data;
    comparing generated pixels of detected image data of a current sweep with shifted detected image data of a previous sweep at the same position in a sweep distance direction; and
    outputting a maximum value of pieces of detected image data as detected image data of the current sweep.

7. The method according to claim 6, the method further comprising, when a predetermined number or more of consecutive pieces of detected image data greater than or equal to a predetermined threshold value are present over a plurality of sweeps at the same position in a distance direction:
    stopping replacement of detected image data of a current sweep with detected image data of a previous sweep based on a sweep on which detected image data at the same position in the distance direction has a value less than the threshold value.

8. The method according to claim 6 or 7, the method further comprising:
    comparing a predetermined number of consecutive pieces of detected image data in the distance direction on the same sweep; and
    outputting most peripheral detected image data of the pieces of detected image data as a maximum value of the consecutive pieces of detected image data.

9. The method according to claim 8, the method further comprising selecting the number of sweeps to be shifted.

10. The method according to claim 9, wherein selecting includes selecting the number of pieces of detected image data to be compared during said comparing a predetermined number step.

* * * * *